United States Patent
Chen et al.

(10) Patent No.: US 7,436,241 B2
(45) Date of Patent: Oct. 14, 2008

(54) CHARGE PUMP

(75) Inventors: Chun-Chung Chen, Hsin-Chu (TW); Shih-Chian Liu, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 93 days.

(21) Appl. No.: 11/685,162

(22) Filed: Mar. 12, 2007

(65) Prior Publication Data
US 2008/0100370 A1    May 1, 2008

(30) Foreign Application Priority Data
Oct. 31, 2006    (TW)    ................ 95140143 A

(51) Int. Cl.
*G05F 1/10*    (2006.01)

(52) U.S. Cl. ................................ 327/536

(58) Field of Classification Search ................ 327/318, 327/319, 536
See application file for complete search history.

(56) References Cited

U.S. PATENT DOCUMENTS

| | | | |
|---|---|---|---|
| 6,208,196 B1* | 3/2001 | St. Pierre | 327/536 |
| 6,788,039 B2 | 9/2004 | Abdoulin | |
| 6,933,706 B2 | 8/2005 | Shih | |
| 7,176,742 B2* | 2/2007 | Aksin et al. | 327/390 |

* cited by examiner

*Primary Examiner*—Jeffrey S Zweizig
(74) *Attorney, Agent, or Firm*—Winston Hsu

(57) ABSTRACT

A charge pump includes a level shifter and a charge exchange control switching circuit. The level shifter can enhance the levels of a first and second clock signals, and output a first and a second control signal corresponding to the enhanced signals. Based on the first and second control signals, the charge exchange control switching circuit amplifies an input voltage and generates a corresponding amplified output voltage.

30 Claims, 10 Drawing Sheets

CHARGE PUMP

BACKGROUND OF THE INVENTION

1. Field of the Invention

The present invention relates to a charge pump, and more particularly, to a charge pump capable of amplifying input voltages and providing corresponding stable output voltages.

2. Description of the Prior Art

Liquid crystal display (LCD) devices are thin flat panel display (FPD) devices characterized in low radiation, small size and low power consumption. LCD devices have gradually replaced traditional cathode ray tube (CRT) devices and have been widely applied in electronic devices such as notebook computers, personal digital assistants (PDA), flat panel televisions, and mobile phones.

Charge pumps are normally used as boosters or voltage multipliers. In LCD devices, a charge pump is often used for boosting the output voltage of a low power source (such as a lithium battery) so as to provide a source driver or a gate driver with a higher working voltage. As well known to those skilled in the art, the polarities of the driving voltages applied to liquid crystal molecules have to be alternated with a certain interval in order to prevent permanent damages of liquid crystal material due to polarization. The amount of current consumed by the source and gate drivers has the maximum value when the polarity of the driving voltage begins to invert. Therefore, the charge pump has the maximum loading at the time of voltage inversion. For an LCD device to function normally and efficiently, the charge pump has to provide a sufficient operational range and efficiency (i.e., voltage gain).

Reference is made to FIG. 1 for a diagram of a prior art constant charge pump 700. The constant charge pump 700 includes a level shifter circuit 27 and a charge exchange control switching circuit 37. The level shifter circuit 27 includes switches SW1-SW4, and the charge exchange control switching circuit 37 includes switches SW5-SW8. $V_{IN}$ and $V_{OUT}$ represent the voltages established at an input end and an output end of the constant charge pump 700, respectively. The level shifter circuit 27 receives clock signals CLK and XCK respectively at a node A1 and a node A2, amplifies the levels of the clock signals CLK and XCK using the switches SW1-SW4, and outputs control signals S1 and S2 with amplified levels respectively at a node B1 and a node B2. The charge exchange control switching circuit 37 controls the switches SW5-SW8 based on the control signals S1 and S2 so that the input voltage $V_{IN}$ can be amplified to the required output voltage $V_{OUT}$ for voltage-boosting. In the prior art constant charge pump 700, the switches SW1, SW2, SW5 and SW6 can include N-type metal-oxide-semiconductor (NMOS) transistors, and the switches SW3, SW4, SW7 and SW8 can include P-type metal-oxide-semiconductor (PMOS) transistors. The prior art constant charge pump 700 can accurately generate the output voltage $V_{OUT}$ by efficiently driving the charge exchange control switching circuit 37 using the control signals S1 and S2 with a full voltage swing provided by the level shifter circuit 27. However, the prior art constant charge pump 700 has the best performance when the amount of loading varies slightly. When applied to designs with large loading variations, the operational efficiency of the constant charge pump 700 greatly attenuates with a small load, and the constant charge pump 700 may not be able to function normally with a large load.

Reference is made to FIG. 2 for a diagram of a prior art capacitive push-pull charge pump 800. The capacitive push-pull charge pump 800 includes a level shifter circuit 28 and a charge exchange control switching circuit 38. The level shifter circuit 28 includes switches SW1, SW2 and capacitors $C_{LS1}$ and $C_{LS2}$. The charge exchange control switching circuit 38 includes switches SW3-SW6. $V_{IN}$ and $V_{OUT}$ represent the voltages established at an input end and an output end of the capacitive push-pull charge pump 800, respectively. The level shifter circuit 28 receives clock signals CLK and XCK respectively at a node A1 and a node A2, amplifies the levels of the clock signals CLK and XCK using the switches SW1 and SW2, and outputs control signals S1 and S2 with amplified levels respectively at a node B1 and a node B2. The charge exchange control switching circuit 38 controls the switches SW3-SW6 based on the control signals S1 and S2 so that the input voltage $V_{IN}$ can be amplified to the required output voltage $V_{OUT}$ for voltage-boosting. In the prior art capacitive push-pull charge pump 800, the switches SW1, SW2, SW5 and SW6 can include PMOS transistors, and the switches SW3 and SW4 can include NMOS transistors. The prior art capacitive push-pull charge pump 800 can automatically adjust the amplitude of the control signals S1 and S2 according to the amount of charges provided by the load. Therefore, the amount of charges required for performing charge exchange can be lowered, and the capacitive push-pull charge pump 800 can provide a higher operational efficiency. However, the capacitive push-pull charge pump 800 cannot provide the control signals S1 and S2 with a full voltage swing. As a result, the output voltage of the capacitive push-pull charge pump 800 is less stable and easily varies when the amount of loading changes.

SUMMARY OF THE INVENTION

One object of the present invention is to provide a charge pump capable of amplifying an input voltage received at an input end and outputting an amplified output voltage at an output end. The charge pump comprises a first level shifter for receiving a first clock signal and a second clock signal respectively at a first input end and a second input end, enhancing levels of the first and second clock signals, and outputting a corresponding first control signal and a second control signal respectively at a first output end and a second output end; and a first charge exchange control switching circuit including an input end and an output end respectively coupled to the input end and the output end of the charge pump for receiving the input voltage, enhancing a level of the input voltage based on the first and second control signals, and outputting the corresponding output voltage. The first level shifter comprises a first switch having a control end coupled to the first input end of the first level shifter, a first end, and a second end coupled to the first output end of the first level shifter; a second switch having a control end coupled to the second input end of the first level shifter, a first end coupled to the first end of the first switch, and a second end coupled to the second output end of the first level shifter; a third switch having a control end coupled to the second output end of the first level shifter, a first end coupled to the output end of the charge pump, and a second end coupled to the first output end of the first level shifter; a fourth switch having a control end coupled to the first output end of the first level shifter, a first end coupled to the output end of the charge pump, and a second end coupled to the second output end of the first level shifter; a first capacitor coupled between the first input end and the second output end of the first level shifter; and a second capacitor coupled between the second input end and the first output end of the first level shifter. The first charge exchange control switching circuit comprises a fifth switch having a control end coupled to the first output end of the first level shifter, a first end coupled to the first input end of the first level shifter, and a second end coupled to the input end of the charge pump; a sixth switch having a control end coupled to the second output end of the first level shifter, a first end coupled to the second input end of the first level shifter, and a second end coupled to the input end of the charge pump; a seventh switch having a control end coupled to the first output end of the first level shifter, a first end coupled to the output end of the charge pump, and a second end coupled to the first input end of the first level shifter; and an eighth switch having a control end coupled to the second output end of the first level shifter, a first end coupled to the second input end of the first level shifter, and a second end coupled to the output end of the charge pump.

Another object of the present invention is to provide a charge pump capable of amplifying an input voltage received at an input end and outputting an amplified output voltage at an output end. The charge pump comprises a first level shifter for receiving a first clock signal and a second clock signal respectively at a first input end and a second input end, enhancing levels of the first and second clock signals, and outputting a corresponding first control signal and a second control signal respectively at a first output end and a second output end; and a first charge exchange control switching circuit for enhancing a level of the input voltage based on the first and second control signals and outputting the corresponding output voltage. The first level shifter comprises a first switch having a control end coupled to the first input end of the first level shifter, a first end coupled to the first output end of the first level shifter, and a second end coupled to the input end of the charge pump; a second switch having a control end coupled to the second input end of the first level shifter, a first end coupled to the second output end of the first level shifter, and a second end coupled to the input end of the charge pump; a third switch having a control end coupled to the second output end of the first level shifter, a first end coupled to the first output end of the first level shifter, and a second end coupled to the output end of the charge pump; a fourth switch having a control end coupled to the first output end of the first level shifter, a first end coupled to the second output end of the first level shifter, and a second end coupled to the output end of the charge pump; a first capacitor coupled between the second input end and the first output end of the first level shifter; and a second capacitor coupled between the first input end and the second output end of the first level shifter. The first charge exchange control switching circuit comprises a fifth switch having a control end coupled to the second output end of the first level shifter, a first end, and a second end coupled to the first input end of the first level shifter; a sixth switch having a control end coupled to the first output end of the first level shifter, a first end coupled to the first end of the fifth switch, and a second end coupled to the second input end of the first level shifter; a seventh switch having a control end coupled to the first output end of the first level shifter, a first end coupled to the second end of the fifth switch, and a second end coupled to the output end of the charge pump; and an eighth switch having a control end coupled to the second output end of the first level shifter, a first end coupled to the second end of the sixth switch, and a second end coupled to the output end of the charge pump.

These and other objectives of the present invention will no doubt become obvious to those of ordinary skill in the art after reading the following detailed description of the preferred embodiment that is illustrated in the various figures and drawings.

DETAILED DESCRIPTION

Figure 3:
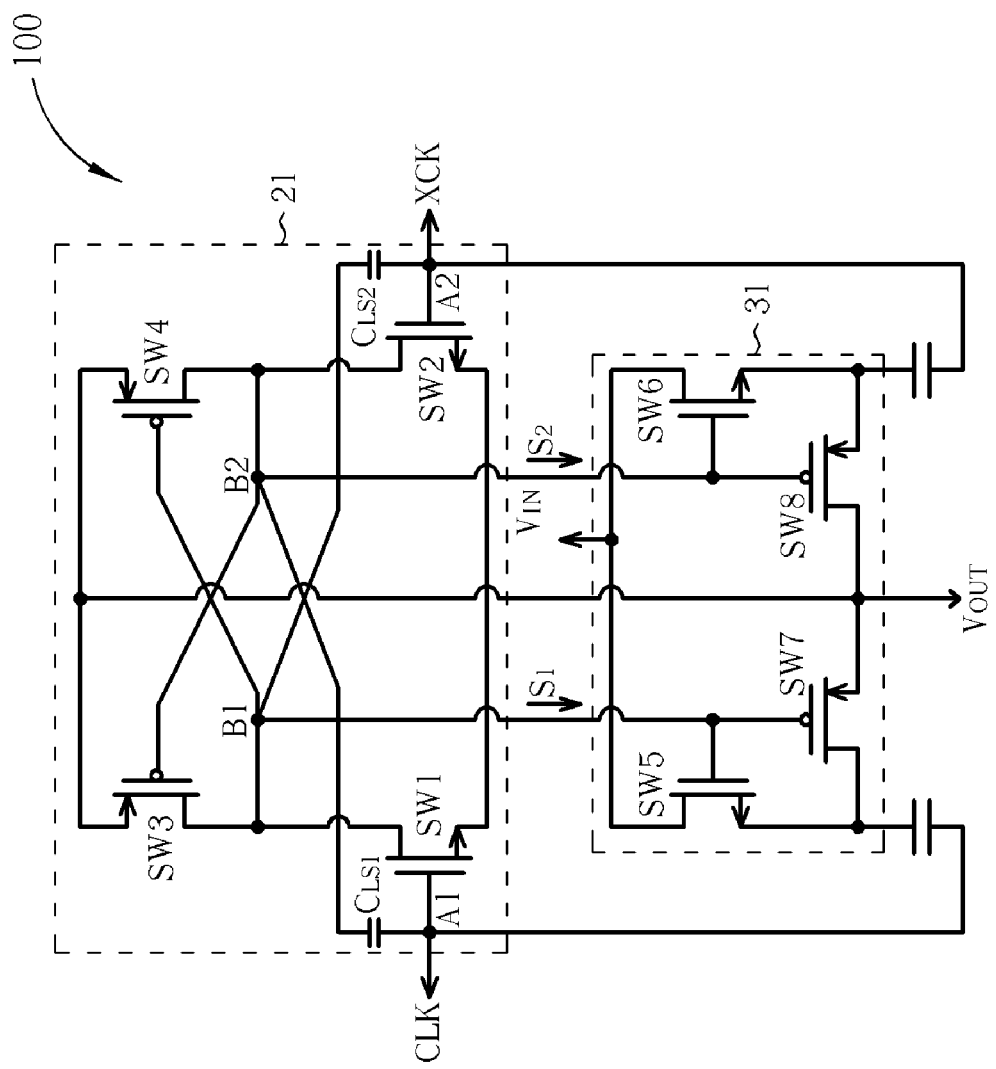
FIG. 3 is a diagram of a positive-polarity charge pump according to the first embodiment of the present invention.

Reference is made to FIG. 3 for a diagram of a positive-polarity charge pump 100 according to the first embodiment of the present invention. The positive-polarity charge pump 100 includes a level shifter circuit 21 and a charge exchange control switching circuit 31. The level shifter circuit 21 includes switches SW1-SW4 and capacitors $C_{LS1}$ and $C_{LS2}$. The charge exchange control switching circuit 31 includes switches SW5-SW8. $V_{IN}$ and $V_{OUT}$ represent the voltages established at an input end and an output end of the positive-polarity charge pump 100, respectively. The switches SW1, SW2, SW5 and SW6 can include NMOS transistors, and the switches SW3, SW4, SW7 and SW8 can include PMOS transistors.

In the level shifter circuit 21, the gates of the switches SW1 and SW2 are respectively coupled to the nodes A1 and A2. The drains of the switches SW1 and SW2 are respectively coupled to the nodes B1 and B2, and the sources of the switches SW1 and SW2 are coupled to each other. The gates of the switches SW3 and SW4 are respectively coupled to the nodes B2 and B1. The drains of the switches SW3 and SW4 are respectively coupled to the nodes B1 and B2, and the sources of the switches SW3 and SW4 are both coupled to the output end of the positive-polarity charge pump 100. Also, the capacitor $C_{LS1}$ is coupled between the node A1 and the node B2, while the capacitor $C_{LS2}$ is coupled between the node A2 and the node B1. The level shifter circuit 21 receives clock signals CLK and XCK respectively at the node A1 and the node A2, amplifies the levels of the clock signals CLK and XCK using the switches SW1-SW4, and respectively outputs corresponding control signals S1 and S2 with amplified levels at the node B1 and the node B2.

In the charge exchange control switching circuit 31, the gates of the switches SW5 and SW6 are respectively coupled to the nodes B1 and B2, and the drains of the switches SW5 and SW6 are both coupled to the input end of the positive-polarity charge pump 100. The gates of the switches SW7 and SW8 are respectively coupled to the nodes B1 and B2. The drains of the switches SW7 and SW8 are respectively coupled to the source of the switch SW5 and the output end of the positive-polarity charge pump 100, and the sources of the switches SW7 and SW8 are respectively coupled to the output end of the positive-polarity charge pump 100 and the source of the switch SW6. The charge exchange control switching circuit 31 controls the switches SW5-SW8 based on the control signals S1 and S2 so that the input voltage $V_{IN}$ can be amplified to the required output voltage $V_{OUT}$ having a positive polarity for voltage-boosting.

The positive-polarity charge pump 100 according to the first embodiment of the present invention can provide the control signals S1 and S2 with a full voltage swing, thereby generating the output voltage $V_{OUT}$ with a positive polarity accurately. Also, the positive-polarity charge pump 100 can provide a higher operational efficiency since it can be stabilized within a short period of time.

Figure 4:
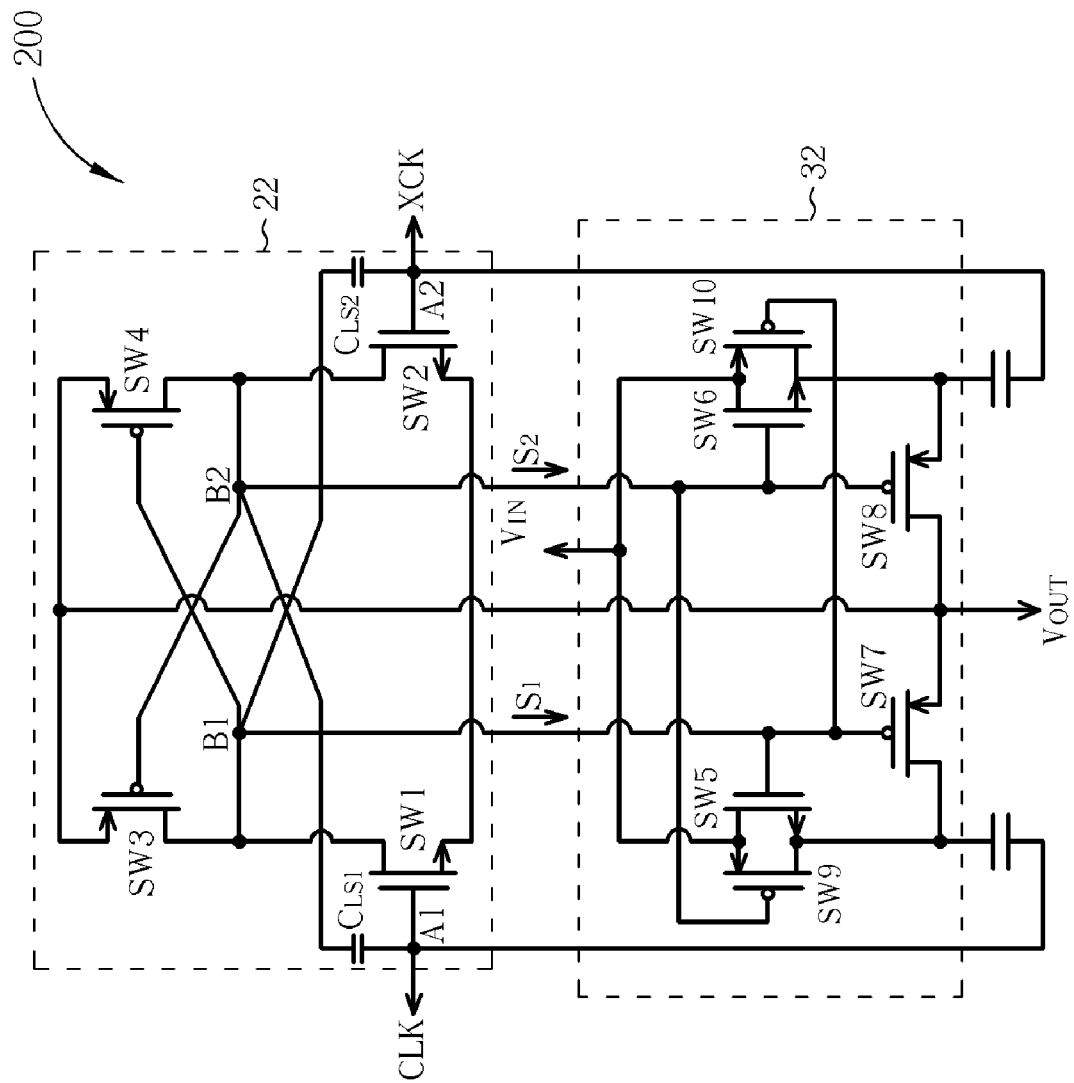
FIG. 4 is a diagram of a positive-polarity charge pump according to the second embodiment of the present invention.

Reference is made to FIG. 4 for a diagram of a positive-polarity charge pump 200 according to the second embodiment of the present invention. The positive-polarity charge pump 200 includes a level shifter circuit 22 and a charge exchange control switching circuit 32. The level shifter circuit 22 includes switches SW1-SW4 and capacitors $C_{LS1}$ and $C_{LS2}$. The charge exchange control switching circuit 32 includes switches SW5-SW10. $V_{IN}$ and $V_{OUT}$ represent the voltages established at an input end and an output end of the positive-polarity charge pump 200, respectively. The switches SW1, SW2, SW5 and SW6 can include NMOS transistors, and the switches SW3, SW4, SW7-SW10 can include PMOS transistors.

In the level shifter circuit 22, the gates of the switches SW1 and SW2 are respectively coupled to a node A1 and a node A2. The drains of the switches SW1 and SW2 are respectively coupled to a node B1 and a node B2, and the sources of the switches SW1 and SW2 are coupled to each other. The gates of the switches SW3 and SW4 are respectively coupled to the nodes B2 and B1. The drains of the switches SW3 and SW4 are respectively coupled to the nodes B1 and B2, and the sources of the switches SW3 and SW4 are both coupled to the output end of the positive-polarity charge pump 200. Also, the capacitor $C_{LS1}$ is coupled between the node A1 and the node B2, while the capacitor $C_{LS2}$ is coupled between the node A2 and the node B1. The level shifter circuit 22 receives clock signals CLK and XCK respectively at the node A1 and the node A2, amplifies the levels of the clock signals CLK and XCK using the switches SW1-SW4, and respectively outputs corresponding control signals S1 and S2 with amplified levels at the node B1 and the node B2.

In the charge exchange control switching circuit 32, the gates of the switches SW5 and SW6 are respectively coupled to the nodes B1 and B2, and the drains of the switches SW5 and SW6 are both coupled to the input end of the positive-polarity charge pump 200. The gates of the switches SW7 and SW8 are respectively coupled to the nodes B1 and B2. The drains of the switches SW7 and SW8 are respectively coupled to the source of the switch SW5 and the output end of the positive-polarity charge pump 200, and the sources of the switches SW7 and SW8 are respectively coupled to the output end of the positive-polarity charge pump 200 and the source of the switch SW6. The gates of the switches SW9 and SW10 are respectively coupled to the nodes B2 and B1. The drains of the switches SW9 and SW10 are respectively coupled to the source of the switch SW5 and the source of the switch SW6, and the sources of the switches SW9 and SW10 are respectively coupled to the drain of the switch SW5 and the drain of the switch SW6. The charge exchange control switching circuit 32 controls the switches SW5-SW10 based on the control signals S1 and S2 so that the input voltage $V_{IN}$ can be amplified to the required output voltage $V_{OUT}$ having a positive polarity for voltage-boosting.

The positive-polarity charge pump 200 according to the second embodiment of the present invention can provide the control signals S1 and S2 with a full voltage swing, thereby generating the output voltage $V_{OUT}$ with a positive polarity accurately. Also, switches SW5, SW9 and the switches SW6, SW10 form a complimentary metal oxide semiconductor (CMOS) structure capable of further reducing the settling time of the charge exchange control switching circuit 32 and thus providing a higher operational efficiency.

Figure 5:
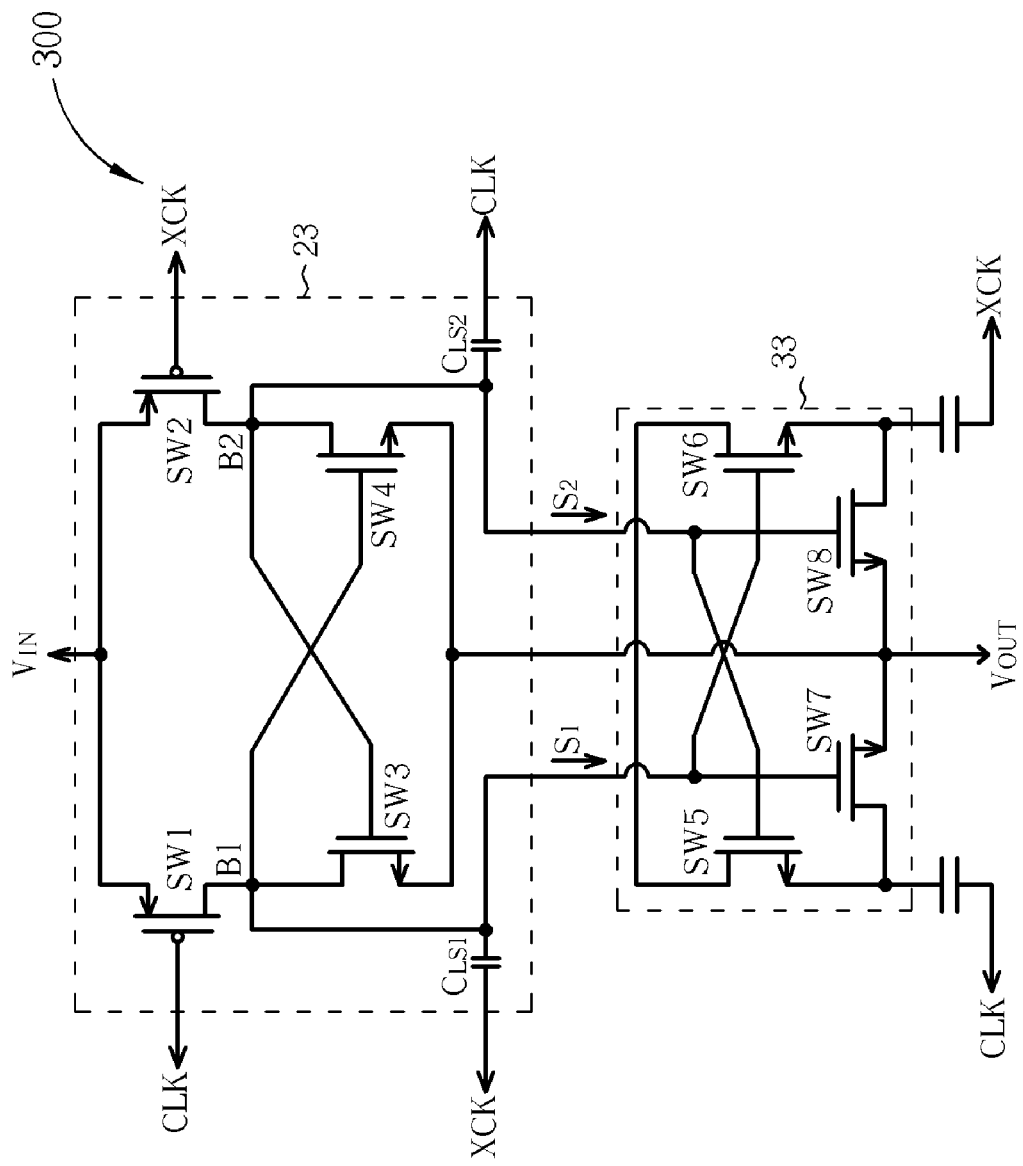
FIG. 5 is a diagram of a negative-polarity charge pump according to the third embodiment of the present invention.

Reference is made to FIG. 5 for a diagram of a negative-polarity charge pump 300 according to the third embodiment of the present invention. The negative-polarity charge pump 300 includes a level shifter circuit 23 and a charge exchange control switching circuit 33. The level shifter circuit 23 includes switches SW1-SW4 and capacitors $C_{LS1}$ and $C_{LS2}$. The charge exchange control switching circuit 33 includes switches SW5-SW8. $V_{IN}$ and $V_{OUT}$ represent the voltages established at an input end and an output end of the negative-polarity charge pump 300, respectively. The switches SW1 and SW2 can include PMOS transistors, and the switches SW3-SW8 can include NMOS transistors.

In the level shifter circuit 23, the gates of the switches SW1 and SW2 respectively receive clock signals CLK and XCK. The drains of the switches SW1 and SW2 are respectively coupled to the nodes B1 and B2, and the sources of the switches SW1 and SW2 are coupled to the input end of the negative-polarity charge pump 300. The gates of the switches SW3 and SW4 are respectively coupled to the nodes B2 and B1. The drains of the switches SW3 and SW4 are respectively coupled to the nodes B1 and B2, and the sources of the switches SW3 and SW4 are both coupled to the output end of the negative-polarity charge pump 300. Also, the clock signal CLK is transmitted to the node B1 via the capacitor $C_{LS1}$, while the clock signal XCK is transmitted to the node B2 via the capacitor $C_{LS2}$. The level shifter circuit 23 receives the clock signals CLK and XCK, amplifies the levels of the clock signals CLK and XCK using the switches SW1-SW4, and respectively outputs corresponding control signals S1 and S2 with amplified levels at the node B1 and the node B2.

In the charge exchange control switching circuit 33, the gates of the switches SW5 and SW6 are respectively coupled to the nodes B2 and B1, and the drains of the switches SW5 and SW6 are coupled to each other. The gates of the switches SW7 and SW8 are respectively coupled to the nodes B1 and B2. The drains of the switches SW7 and SW8 are respectively coupled to the source of the switch SW5 and the source of the switch SW6, and the sources of the switches SW7 and SW8 are both coupled to the output end of the negative-polarity charge pump 300. The charge exchange control switching circuit 33 controls the switches SW5-SW8 based on the control signals S1 and S2 so that the input voltage $V_{IN}$ can be amplified to the required output voltage $V_{OUT}$ having a negative polarity for voltage-boosting.

The negative-polarity charge pump 300 according to the third embodiment of the present invention can provide the control signals S1 and S2 with a full voltage swing, thereby generating the output voltage $V_{OUT}$ having a negative polarity accurately. Also, the negative-polarity charge pump 300 can provide a higher operational efficiency since it can be stabilized within a short period of time.

Figure 6:
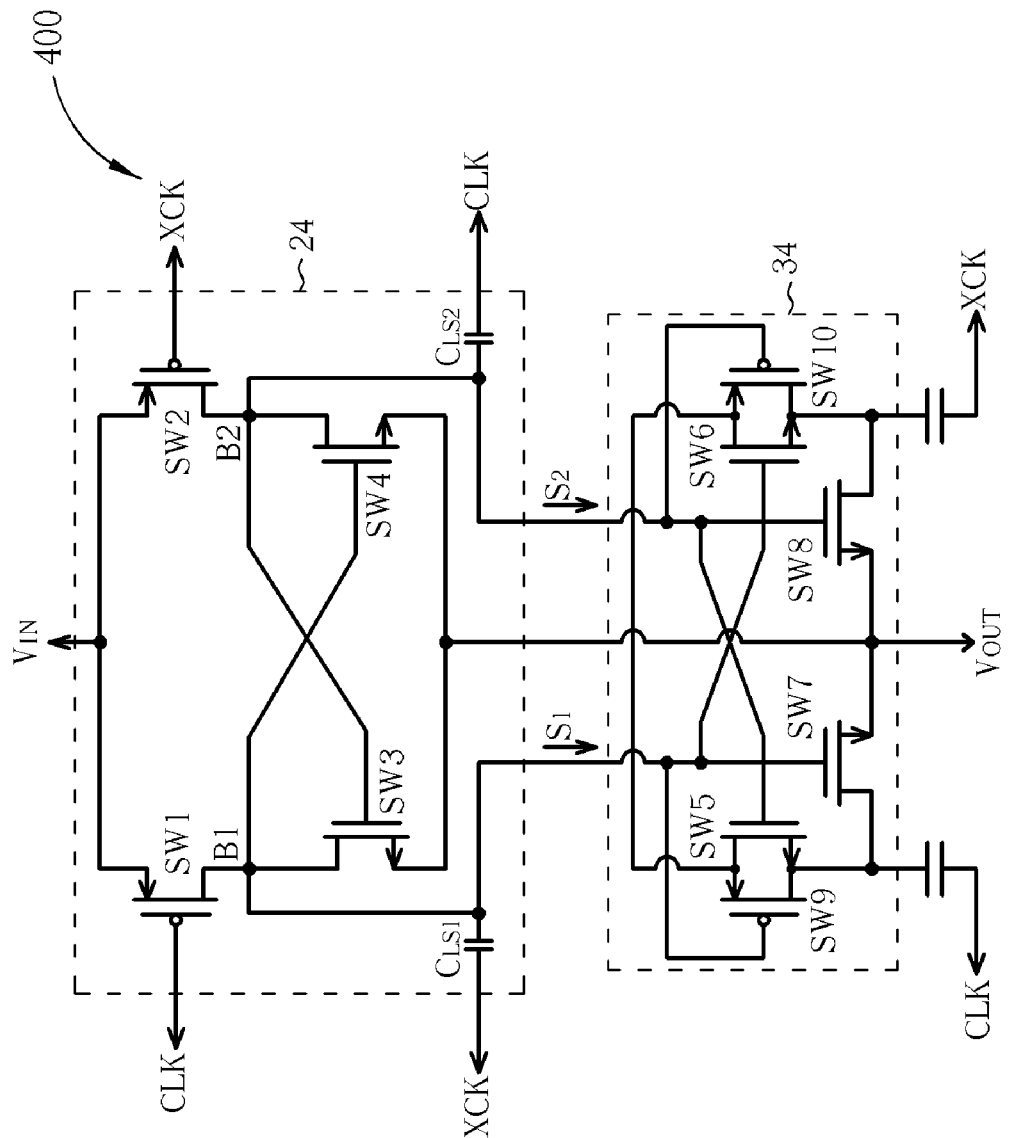
FIG. 6 is a diagram of a negative-polarity charge pump according to the fourth embodiment of the present invention.

Reference is made to FIG. 6 for a diagram of a negative-polarity charge pump 400 according to the fourth embodiment of the present invention. The negative-polarity charge pump 400 includes a level shifter circuit 24 and a charge exchange control switching circuit 34. The level shifter circuit 24 includes switches SW1-SW4 and capacitors $C_{LS1}$ and $C_{LS2}$. The charge exchange control switching circuit 34 includes switches SW5-SW10. $V_{IN}$ and $V_{OUT}$ represent the voltages established at an input end and an output end of the negative-polarity charge pump 400, respectively. The switches SW1, SW2, SW9 and SW10 can include PMOS transistors, and the switches SW3-SW8 can include NMOS transistors.

In the level shifter circuit 24, the gates of the switches SW1 and SW2 respectively receive clock signals CLK and XCK. The drains of the switches SW1 and SW2 are respectively coupled to the nodes B1 and B2, and the sources of the switches SW1 and SW2 are coupled to the input end of the negative-polarity charge pump 400. The gates of the switches SW3 and SW4 are respectively coupled to the nodes B2 and B1. The drains of the switches SW3 and SW4 are respectively coupled to the nodes B1 and B2, and the sources of the switches SW3 and SW4 are both coupled to the output end of the negative-polarity charge pump 400. Also, the clock signal XCK is transmitted to the node B1 via the capacitor $C_{LS1}$, while the clock signal CLK is transmitted to the node B2 via the capacitor $C_{LS2}$. The level shifter circuit 24 receives the clock signals CLK and XCK, amplifies the levels of the clock signals CLK and XCK using the switches SW1-SW4, and respectively outputs corresponding control signals S1 and S2 with amplified levels at the node B1 and the node B2.

In the charge exchange control switching circuit 34, the gates of the switches SW5 and SW6 are respectively coupled to the nodes B2 and B1, and the drains of the switches SW5 and SW6 are coupled to each other. The gates of the switches SW7 and SW8 are respectively coupled to the nodes B1 and B2. The drains of the switches SW7 and SW8 are respectively coupled to the source of the switch SW5 and the source of the switch SW6, and the sources of the switches SW7 and SW8 are both coupled to the output end of the negative-polarity charge pump 400. The gates of the switches SW9 and SW10 are respectively coupled to the nodes B1 and B2. The drains of the switches SW9 and SW10 are respectively coupled to the source of the switch SW5 and the source of the switch SW6, and the sources of the switches SW9 and SW10 are respectively coupled to the drain of the switch SW5 and the drain of the switch SW6. The charge exchange control switching circuit 34 controls the switches SW5-SW10 based on the control signals S1 and S2 so that the input voltage $V_{IN}$ can be amplified to the required output voltage $V_{OUT}$ having a negative polarity for voltage-boosting.

The negative-polarity charge pump 400 according to the fourth embodiment of the present invention can provide the control signals S1 and S2 with a full voltage swing, thereby generating the output voltage $V_{OUT}$ having a negative polarity accurately. Also, switches SW5, SW9 and the switches SW6, SW10 form a CMOS structure capable of further reducing the stable time of the charge exchange control switching circuit 34 and thus providing a higher operational efficiency.

Figure 7:
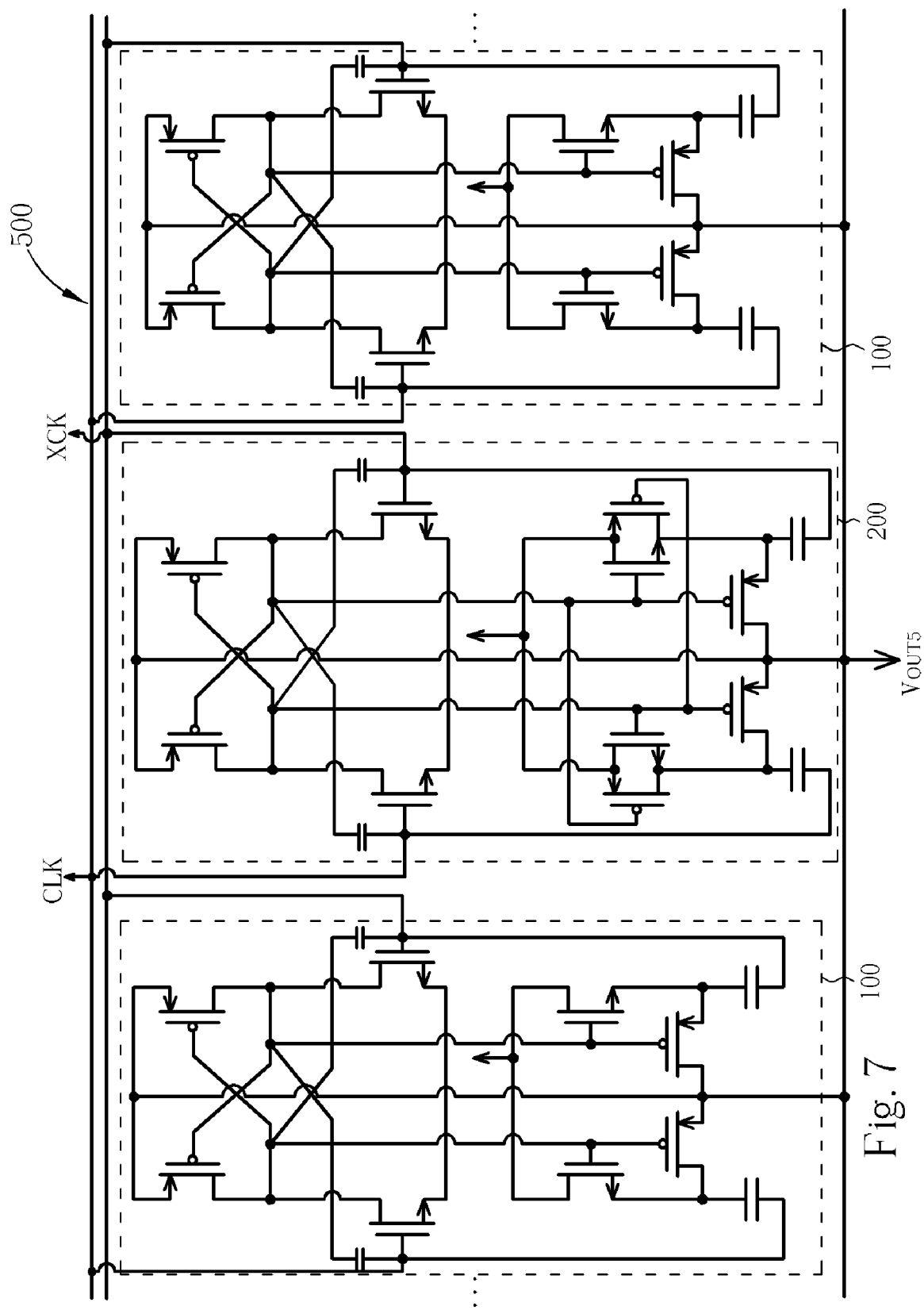
FIG. 7 is a combinational charge pump according to the fifth embodiment of the present invention.

The present invention can also use a plurality of charge pumps for providing various operational ranges and efficiencies. Reference is made to FIG. 7 for a combinational charge pump 500 according to the fifth embodiment of the present invention. The combinational charge pump 500 includes a charge pump 200 and a plurality of charge pumps 100 (only two charge pumps 100 are depicted in FIG. 7). The charge pump 200 and each charge pump 100 are respectively depicted in FIG. 4 and FIG. 3. $V_{OUT5}$ represents the voltage established at the output end of the combinational charge pump 500. The charge pump 200 and the plurality of charge pumps 100 are coupled in parallel with each other. Each charge pump receives the clock signals CLK and XCK respectively at the node A1 and the node A2, amplifies the levels of the clock signals CLK and XCK using the switches SW1-SW4, and respectively outputs corresponding control signals S1 and S2 with amplified levels at the node B1 and the node B2. Therefore, the input voltage $V_{IN}$ can be amplified to the required output voltage $V_{OUT5}$ for voltage-boosting.

Figure 1:
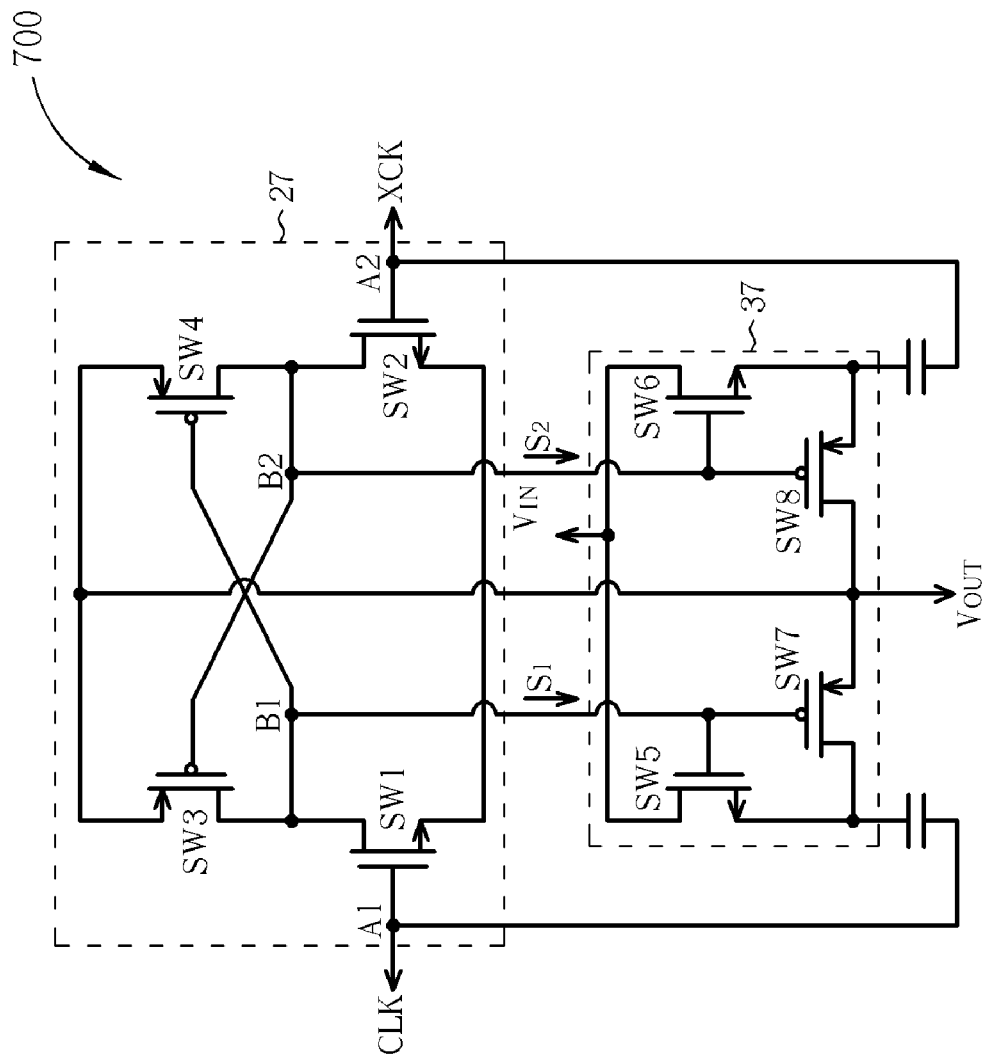
FIG. 1 is a diagram of a prior art constant charge pump.
Figure 2:
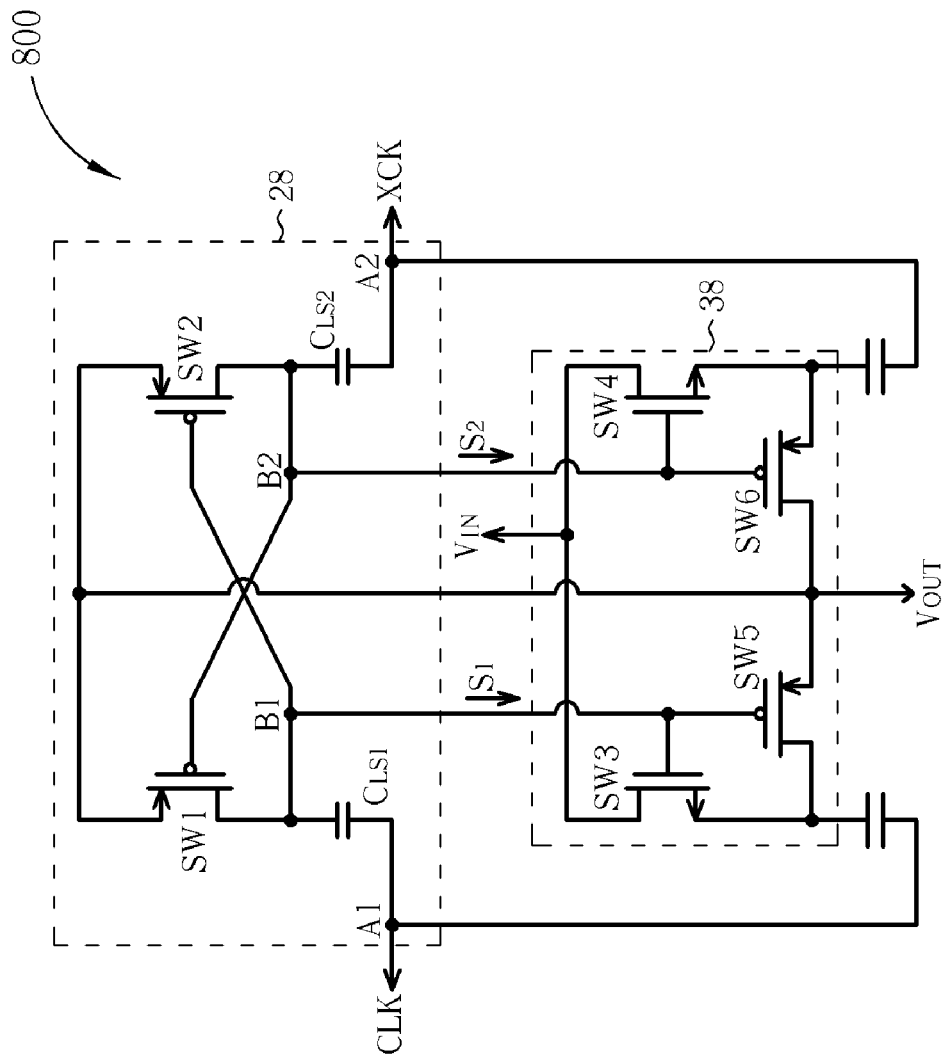
FIG. 2 is a diagram of a prior art capacitive push-pull charge pump.
Figure 8:
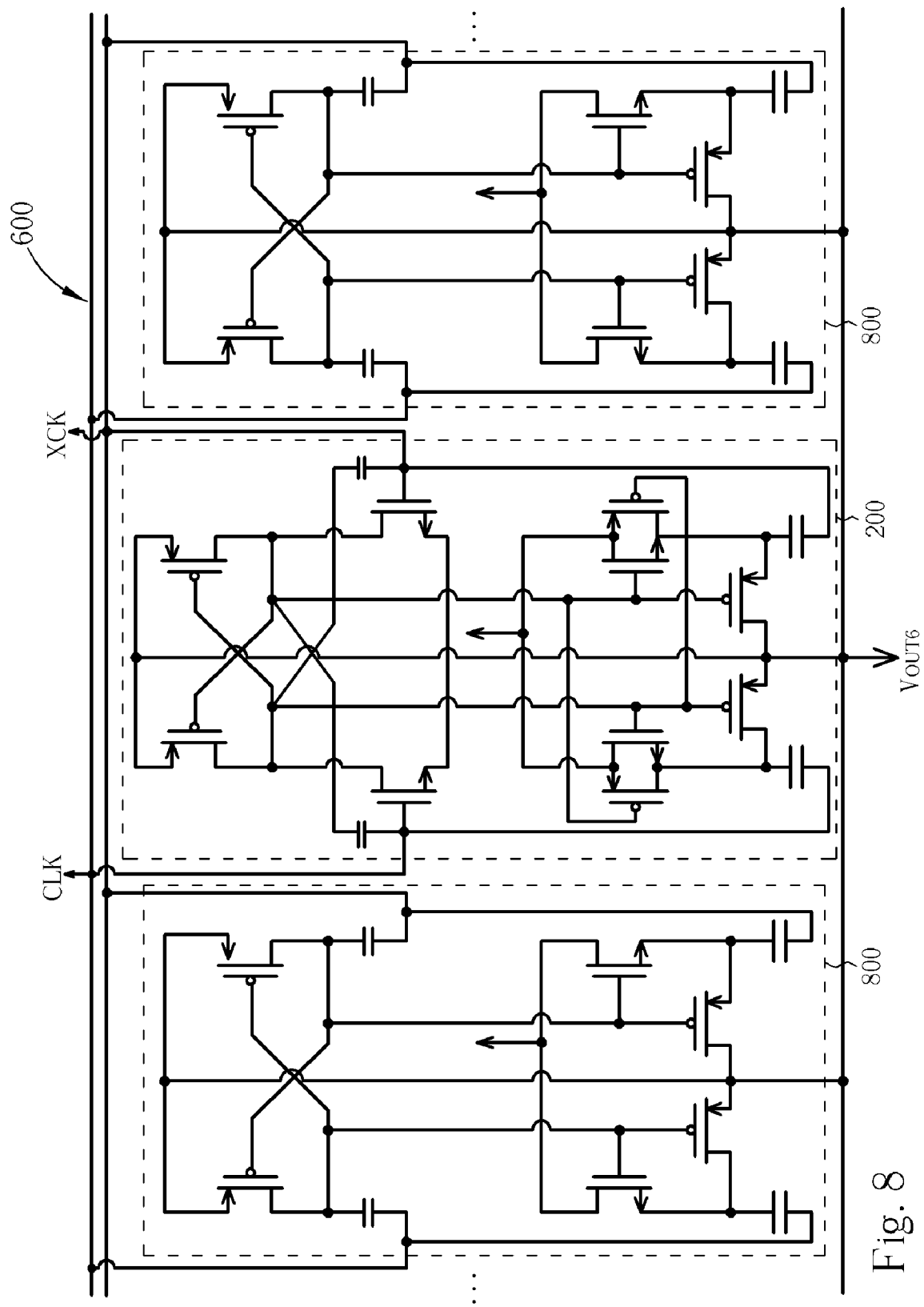
FIG. 8 is a combinational charge pump according to the sixth embodiment of the present invention.

Reference is made to FIG. 8 for a combinational charge pump 600 according to the sixth embodiment of the present invention. The combinational charge pump 600 includes a charge pump 200 and a plurality of charge pumps 800 (only two charge pumps 800 are depicted in FIG. 8). The charge pump 200 and each charge pump 800 are respectively depicted in FIG. 4 and FIG. 2. $V_{OUT6}$ represents the voltage established at the output end of the combinational charge pump 600. The charge pump 200 and the plurality of charge pumps 800 are coupled in parallel with each other. Each charge pump receives the clock signals CLK and XCK respectively at the node A1 and the node A2, amplifies the levels of the clock signals CLK and XCK using the switches SW1-SW4, and respectively outputs the corresponding control signals S1 and S2 with amplified levels at the node B1 and the node B2. Therefore, the input voltage $V_{IN}$ can be amplified to the required output voltage $V_{OUT6}$ for voltage-boosting.

Figure 9:
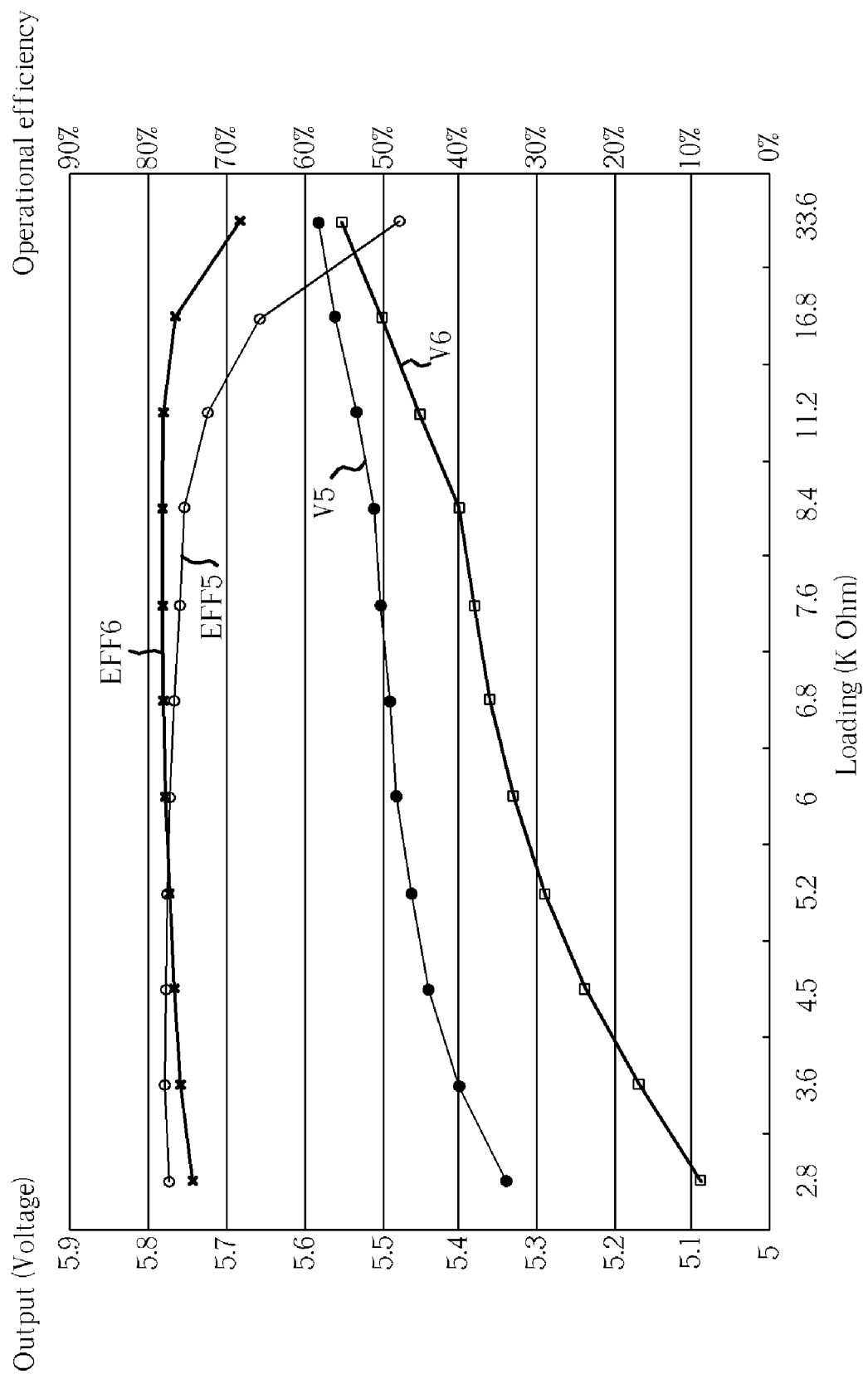
FIG. 9 is a signal diagram showing simulation results of the output voltage and the operational efficiency of the combinational charge pumps in FIGS. 7 and 8.

Reference is made to FIG. 9 for a signal diagram showing simulation results of the output voltage and the operational efficiency of the combinational charge pumps 500 and 600. In FIG. 9, the left transverse axis represents the output voltage in volts (V), the right transverse axis represents the operational efficiency in percentage (%), and the horizontal axis represents the output loading in k ohms. Curves V3 and V4 respectively represent the output voltages $V_{OUT5}$ and $V_{OUT6}$ of the combinational charge pumps 500 and 600. Curves EFF5 and EFF6 respectively represent the operational efficiencies of the combinational charge pumps 500 and 600. As shown in FIG. 9, the combinational charge pumps 500 and 600 can provide various operational ranges and efficiencies.

Figure 10:
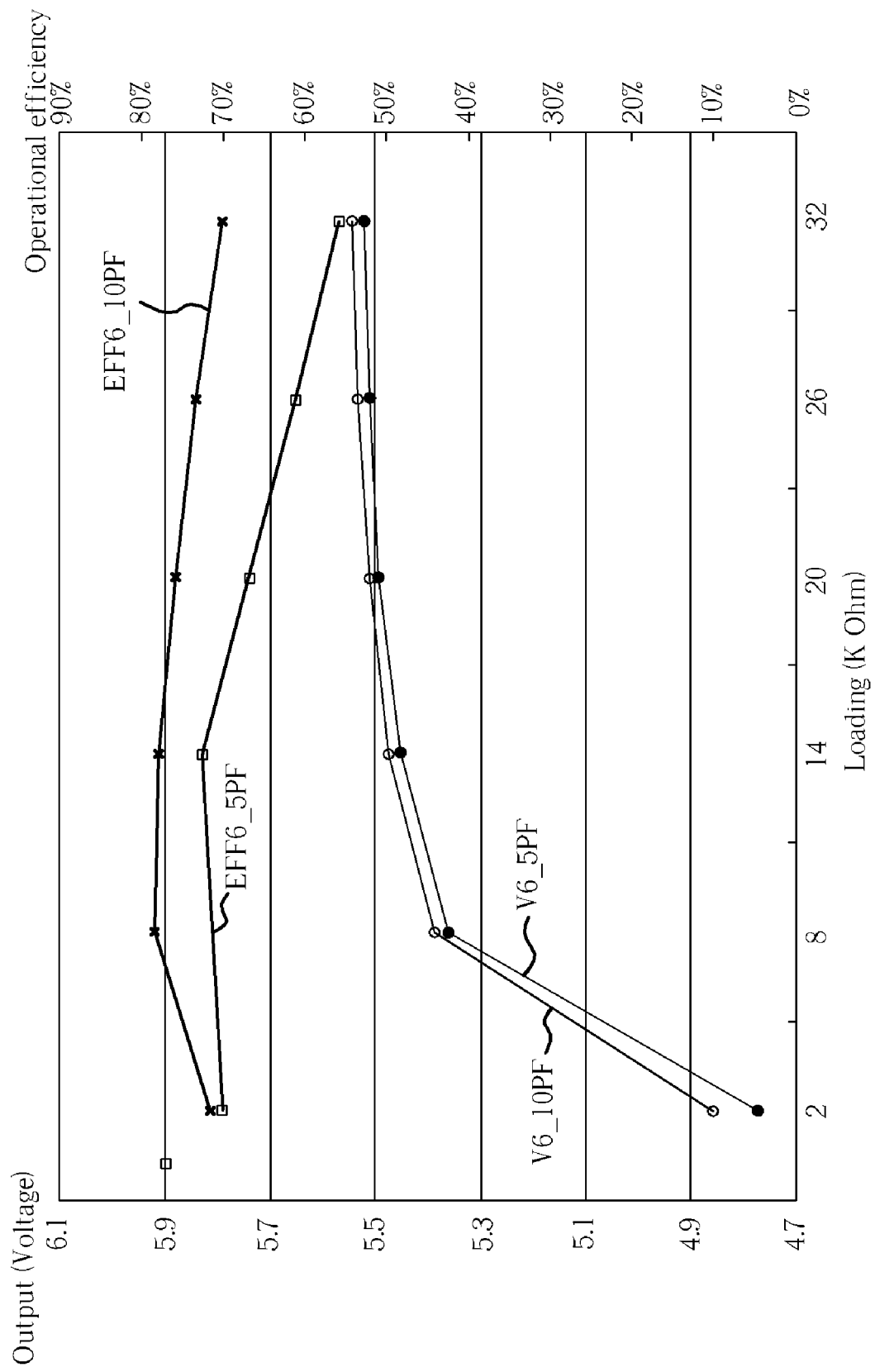
FIG. 10 is a signal diagram showing simulation results of the output voltage and the operational efficiency of the combinational charge pump in FIG. 8.

Also, the present invention can adjust the output voltage and the operational efficiency using the capacitors $C_{LS1}$ and $C_{LS2}$. Reference is made to FIG. 10 for a signal diagram showing simulation results of the output voltage and the operational efficiency of the combinational charge pump 600. In FIG. 10, the left transverse axis represents the output voltage in volts, the right transverse axis represents the operational efficiency in percentage, and the horizontal axis represents the output loading in k ohms. Curves V6_5 PF and EFF6_5 PF respectively represent the output voltage and the operational efficiency of the combinational charge pump 600 when the capacitors $C_{LS1}$ and $C_{LS2}$ both equal to 5 picofarad (pF). Curves V6_10 PF and EFF6_10 PF respectively represent the output voltage and the operational efficiency of the combinational charge pump 600 when the capacitors $C_{LS1}$ and $C_{LS2}$ both equal to 10 pF.

The level shifter according to the present invention can be stabilized quickly and can provide the charge exchange control switching circuit with control signals having a full voltage swing. Therefore, the resistance of the transistor switches can be largely reduced for effectively providing stable output voltages. Also, the combinational charge pump according to the present invention can further reduce the settling time and stabilize the level of the output voltage, thereby providing various operational ranges and efficiencies. The present invention can be applied to devices such as mobile phones, digital cameras, and PDAs.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A charge pump comprising:
an input end for receiving an input voltage;
an output end for outputting an amplified output voltage;
a first level shifter for receiving a first clock signal and a second clock signal respectively at a first input end and a second input end, enhancing levels of the first and second clock signals, and outputting a corresponding first control signal and a second control signal respectively at a first output end and a second output end, the first level shifter comprising:
a first switch comprising:
a control end coupled to the first input end of the first level shifter;
a first end; and
a second end coupled to the first output end of the first level shifter;
a second switch comprising:
a control end coupled to the second input end of the first level shifter;
a first end coupled to the first end of the first switch; and
a second end coupled to the second output end of the first level shifter;
a third switch comprising:
a control end coupled to the second output end of the first level shifter;
a first end coupled to the output end of the charge pump; and
a second end coupled to the first output end of the first level shifter;
a fourth switch comprising:
a control end coupled to the first output end of the first level shifter;
a first end coupled to the output end of the charge pump; and
a second end coupled to the second output end of the first level shifter;
a first capacitor coupled between the first input end and the second output end of the first level shifter; and
a second capacitor coupled between the second input end and the first output end of the first level shifter; and
a first charge exchange control switching circuit including an input end and an output end respectively coupled to the input end and the output end of the charge pump for receiving the input voltage, enhancing a level of the input voltage based on the first and second control signals, and outputting the corresponding output voltage, the first charge exchange control switching circuit comprising:
a fifth switch comprising:
a control end coupled to the first output end of the first level shifter;
a first end coupled to the first input end of the first level shifter; and
a second end coupled to the input end of the charge pump;
a sixth switch comprising:
a control end coupled to the second output end of the first level shifter;
a first end coupled to the second input end of the first level shifter; and
a second end coupled to the input end of the charge pump;
a seventh switch comprising:
a control end coupled to the first output end of the first level shifter;
a first end coupled to the output end of the charge pump; and
a second end coupled to the first input end of the first level shifter; and
an eighth switch comprising:
a control end coupled to the second output end of the first level shifter;
a first end coupled to the second input end of the first level shifter; and
a second end coupled to the output end of the charge pump.

2. The charge pump of claim 1 wherein the first, second, fifth and sixth switches comprise N-type metal-oxide-semiconductor (NMOS) transistors.

3. The charge pump of claim 1 wherein the third, fourth, seventh and eighth switches comprise P-type metal-oxide-semiconductor (PMOS) transistors.

4. The charge pump of claim 1 further comprising:
a ninth switch comprising:
a control end coupled to the second output end of the first level shifter;
a first end coupled to the second end of the fifth switch; and
a second end coupled to the first end of the fifth switch; and
a tenth switch comprising:
a control end coupled to the first output end of the first level shifter;
a first end coupled to the second end of the sixth switch; and
a second end coupled to the first end of the sixth switch.

5. The charge pump of claim 4 wherein the ninth and tenth switches comprise PMOS transistors.

6. The charge pump of claim 1 wherein the first and second capacitors have the same capacitance.

7. The charge pump of claim 1 further comprising:
a second level shifter for receiving the first clock signal and the second clock signal respectively at a first input end and a second input end, enhancing the levels of the first and second clock signals, and outputting a corresponding third control signal and a fourth control signal respectively at a first output end and a second output end, the second level shifter comprising:
an eleventh switch comprising:
a control end coupled to the first input end of the second level shifter;
a first end; and
a second end coupled to the first output end of the second level shifter;
a twelfth switch comprising:
a control end coupled to the second input end of the second level shifter;
a first end coupled to the first end of the eleventh switch; and
a second end coupled to the second output end of the second level shifter;
a thirteenth switch comprising:
a control end coupled to the second output end of the second level shifter;
a first end coupled to the output end of the charge pump; and
a second end coupled to the first output end of the second level shifter;

a fourteenth switch comprising:
  a control end coupled to the first output end of the second level shifter;
  a first end coupled to the output end of the charge pump; and
  a second end coupled to the second output end of the second level shifter;
a third capacitor coupled between the first input end and the second output end of the second level shifter; and
a fourth capacitor coupled between the second input end and the first output end of the second level shifter; and
a second charge exchange control switching circuit including an input end and an output end respectively coupled to the input end and the output end of the charge pump for receiving the input voltage, enhancing the level of the input voltage based on the third and fourth control signals, and outputting the corresponding output voltage, the second charge exchange control switching circuit comprising:
  a fifteenth switch comprising:
    a control end coupled to the first output end of the second level shifter;
    a first end coupled to the first input end of the second level shifter; and
    a second end coupled to the input end of the charge pump;
  a sixteenth switch comprising:
    a control end coupled to the second output end of the second level shifter;
    a first end coupled to the second input end of the second level shifter; and
    a second end coupled to the input end of the charge pump;
  a seventeenth switch comprising:
    a control end coupled to the first output end of the second level shifter;
    a first end coupled to the output end of the charge pump; and
    a second end coupled to the first input end of the second level shifter; and
  an eighteenth switch comprising:
    a control end coupled to the second output end of the second level shifter;
    a first end coupled to the second input end of the second level shifter; and
    a second end coupled to the output end of the charge pump.

8. The charge pump of claim 7 wherein the eleventh, twelfth, fifteenth and sixteenth switches comprise NMOS transistors.

9. The charge pump of claim 7 wherein the thirteenth, fourteenth, seventeenth and eighteenth switches comprise PMOS transistors.

10. The charge pump of claim 7 further comprising:
a nineteenth switch comprising:
  a control end coupled to the second output end of the second level shifter;
  a first end coupled to the second end of the fifteenth switch; and
  a second end coupled to the first end of the fifteenth switch; and
a twentieth switch comprising:
  a control end coupled to the first output end of the second level shifter;
  a first end coupled to the second end of the sixteenth switch; and
  a second end coupled to the first end of the sixteenth switch.

11. The charge pump of claim 10 wherein the nineteenth and twentieth switches comprise PMOS transistors.

12. The charge pump of claim 7 wherein the third and fourth capacitors have a same capacitance.

13. The charge pump of claim 1 further comprising:
a second level shifter for receiving the first clock signal and the second clock signal respectively at a first input end and a second input end, enhancing the levels of the first and second clock signals, and outputting a corresponding third control signal and a fourth control signal respectively at a first output end and a second output end, the second level shifter comprising:
  a third capacitor having a first end coupled to the first input end of the second level shifter and a second end coupled to the first output end of the second level shifter;
  a fourth capacitor having a first end coupled to the second input end of the second level shifter and a second end coupled to the second output end of the second level shifter;
  an eleventh switch comprising:
    a control end coupled to the second output end of the second level shifter;
    a first end coupled to the output end of the charge pump; and
    a second end coupled to the second end of the third capacitor; and
  a twelfth switch comprising:
    a control end coupled to the first output end of the second level shifter;
    a first end coupled to the output end of the charge pump; and
    a second end coupled to the second end of the fourth capacitor; and
a second charge exchange control switching circuit including an input end and an output end respectively coupled to the input end and the output end of the charge pump for receiving the input voltage, enhancing the level of the input voltage based on the third and fourth control signals, and outputting the corresponding output voltage, the first charge exchange control switching circuit comprising:
  a thirteenth switch comprising:
    a control end coupled to the first output end of the second level shifter;
    a first end coupled to the first input end of the second level shifter; and
    a second end coupled to the input end of the charge pump;
  a fourteenth switch comprising:
    a control end coupled to the second output end of the second level shifter;
    a first end coupled to the second input end of the second level shifter; and
    a second end coupled to the input end of the charge pump;
  a fifteenth switch comprising:
    a control end coupled to the first output end of the second level shifter;
    a first end coupled to the output end of the charge pump; and
    a second end coupled to the first input end of the second level shifter; and an sixteenth switch comprising:
a control end coupled to the second output end of the second level shifter;
a first end coupled to the second input end of the second level shifter; and
a second end coupled to the output end of the charge pump.

14. The charge pump of claim 13 wherein the thirteenth and fourteenth switches comprise NMOS transistors.

15. The charge pump of claim 13 wherein the eleventh, twelfth, fifteenth and sixteenth switches comprise PMOS transistors.

16. The charge pump of claim 13 further comprising:
a seventeenth switch comprising:
a control end coupled to the second output end of the second level shifter;
a first end coupled to the second end of the thirteenth switch; and
a second end coupled to the first end of the thirteenth switch; and
an eighteenth switch comprising:
a control end coupled to the first output end of the second level shifter;
a first end coupled to the second end of the fourteenth switch; and
a second end coupled to the first end of the fourteenth switch.

17. The charge pump of claim 16 wherein the seventeenth and eighteenth switches comprise PMOS transistors.

18. The charge pump of claim 13 wherein the third and fourth capacitors have the same capacitance.

19. A charge pump comprising:
an input end for receiving an input voltage;
an output end for outputting an amplified output voltage;
a first level shifter for receiving a first clock signal and a second clock signal respectively at a first input end and a second input end, enhancing levels of the first and second clock signals, and outputting a corresponding first control signal and a second control signal respectively at a first output end and a second output end, the first level shifter comprising:
a first switch comprising:
a control end coupled to the first input end of the first level shifter;
a first end coupled to the first output end of the first level shifter; and
a second end coupled to the input end of the charge pump;
a second switch comprising:
a control end coupled to the second input end of the first level shifter;
a first end coupled to the second output end of the first level shifter; and
a second end coupled to the input end of the charge pump;
a third switch comprising:
a control end coupled to the second output end of the first level shifter;
a first end coupled to the first output end of the first level shifter; and
a second end coupled to the output end of the charge pump;
a fourth switch comprising:
a control end coupled to the first output end of the first level shifter;
a first end coupled to the second output end of the first level shifter; and
a second end coupled to the output end of the charge pump;
a first capacitor coupled between the second input end and the first output end of the first level shifter; and
a second capacitor coupled between the first input end and the second output end of the first level shifter; and
a first charge exchange control switching circuit for enhancing a level of the input voltage based on the first and second control signals and outputting the corresponding output voltage, the first charge exchange control switching circuit comprising:
a fifth switch comprising:
a control end coupled to the second output end of the first level shifter;
a first end; and
a second end coupled to the first input end of the first level shifter;
a sixth switch comprising:
a control end coupled to the first output end of the first level shifter;
a first end coupled to the first end of the fifth switch; and
a second end coupled to the second input end of the first level shifter;
a seventh switch comprising:
a control end coupled to the first output end of the first level shifter;
a first end coupled to the second end of the fifth switch; and
a second end coupled to the output end of the charge pump; and
an eighth switch comprising:
a control end coupled to the second output end of the first level shifter;
a first end coupled to the second end of the sixth switch; and
a second end coupled to the output end of the charge pump.

20. The charge pump of claim 19 wherein the first and second switches comprise PMOS transistors.

21. The charge pump of claim 19 wherein the third through eighth switches comprise NMOS transistors.

22. The charge pump of claim 19 further comprising:
a ninth switch comprising:
a control end coupled to the first output end of the first level shifter;
a first end coupled to the second end of the fifth switch; and
a second end coupled to the first end of the fifth switch; and
a tenth switch comprising:
a control end coupled to the second output end of the first level shifter;
a first end coupled to the second end of the sixth switch; and
a second end coupled to the first end of the sixth switch.

23. The charge pump of claim 22 wherein the ninth and tenth switches comprise PMOS transistors.

24. The charge pump of claim 19 wherein the first and second capacitors have a same capacitance.

25. The charge pump of claim 19 further comprising:
a second level shifter for receiving the first clock signal and the second clock signal respectively at a first input end and a second input end, enhancing the levels of the first and second clock signals, and outputting a corresponding third control signal and a fourth control signal respectively at a first output end and a second output end, the second level shifter comprising:
an eleventh switch comprising:
  a control end coupled to the first input end of the second level shifter;
  a first end coupled to the first output end of the second level shifter; and
  a second end coupled to input end of the charge pump;
a twelfth switch comprising:
  a control end coupled to the second input end of the second level shifter;
  a first end coupled to the second output end of the second level shifter; and
  a second end coupled to input end of the charge pump;
a thirteenth switch comprising:
  a control end coupled to the second output end of the second level shifter;
  a first end coupled to the first output end of the second level shifter; and
  a second end coupled to the output end of the charge pump;
a fourteenth switch comprising:
  a control end coupled to the first output end of the second level shifter;
  a first end coupled to the second output end of the second level shifter; and
  a second end coupled to the output end of the charge pump;
a third capacitor coupled between the second input end and the first output end of the second level shifter; and
a fourth capacitor coupled between the first input end and the second output end of the second level shifter; and
a second charge exchange control switching circuit for enhancing the level of the input voltage based on the first and second control signals and outputting the corresponding output voltage, the second charge exchange control switching circuit comprising:
  a fifteenth switch comprising:
    a control end coupled to the second output end of the second level shifter;
    a first end; and
    a second end coupled to the first input end of the second level shifter;
  a sixteenth switch comprising:
    a control end coupled to the first output end of the second level shifter;
    a first end coupled to the first end of the fifteenth switch; and
    a second end coupled to the second input end of the second level shifter;
  a seventeenth switch comprising:
    a control end coupled to the first output end of the second level shifter;
    a first end coupled to the second end of the fifteenth switch; and
    a second end coupled to the output end of the charge pump; and
  an eighteenth switch comprising:
    a control end coupled to the second output end of the second level shifter;
    a first end coupled to the second end of the sixteenth switch; and
    a second end coupled to the output end of the charge pump.

26. The charge pump of claim 25 wherein the eleventh and twelfth switches comprise PMOS transistors.

27. The charge pump of claim 25 wherein the thirteenth through eighteenth switches comprise NMOS transistors.

28. The charge pump of claim 25 further comprising:
a nineteenth switch comprising:
  a control end coupled to the first output end of the second level shifter;
  a first end coupled to the second end of the fifteenth switch; and
  a second end coupled to the first end of the fifteenth switch; and
a twentieth switch comprising:
  a control end coupled to the second output end of the second level shifter;
  a first end coupled to the second end of the sixteenth switch; and
  a second end coupled to the first end of the sixteenth switch.

29. The charge pump of claim 28 wherein the nineteenth and twentieth switches comprise PMOS transistors.

30. The charge pump of claim 19 wherein the third and fourth capacitors have a same capacitance.

* * * * *